United States Patent [19]

Cowell et al.

[11] 4,123,421
[45] Oct. 31, 1978

[54] STABLE TERTIARY AMINE CONTAINING TERMINALLY UNSATURATED POLYURETHANE RESINS

[75] Inventors: Richard D. Cowell, Jersey City; Peter Loewrigkeit, Wyckoff, both of N.J.; William Rosenblatt, Pearl River, N.Y.; Claire Bluestein, Secaucus, N.J.

[73] Assignee: Witco Chemical Corporation, New York, N.Y.

[21] Appl. No.: 779,437

[22] Filed: Mar. 21, 1977

[51] Int. Cl.$^2$ .............................................. C08G 18/10
[52] U.S. Cl. ......................................... 528/65; 528/66; 528/75
[58] Field of Search ............... 260/77.5 CR, 77.5 AQ, 260/75 NQ

[56] References Cited

U.S. PATENT DOCUMENTS

| | | | |
|---|---|---|---|
| 3,100,759 | 8/1963 | Boussu et al. | 260/75 NQ |
| 3,437,514 | 4/1969 | Burlant | 260/872 |
| 3,448,171 | 6/1969 | Damusis | 260/858 |
| 3,509,234 | 4/1970 | Burbank et al. | 260/77.5 CR |
| 3,641,199 | 2/1972 | Niederhauser et al. | 260/77.5 CR |
| 3,726,838 | 4/1973 | Eimen et al. | 260/77.5 AQ |
| 3,792,023 | 2/1974 | Havenith et al. | 260/77.5 AQ |
| 3,823,118 | 7/1974 | Matsunaga et al. | 260/77.5 AQ |
| 3,873,484 | 3/1975 | Bluestein et al. | 260/77.5 AQ |
| 3,877,945 | 4/1975 | Rosenhahn | 96/57 |
| 3,877,971 | 4/1975 | Guthrie et al. | 204/159.19 |
| 3,878,036 | 4/1975 | Chang | 260/77.5 CR |
| 3,891,523 | 6/1975 | Hisamatsu et al. | 260/77.5 CR |
| 3,899,611 | 8/1975 | Hall | 204/159.23 |
| 3,939,126 | 2/1976 | Carder et al. | 260/77.5 AQ |
| 3,971,764 | 7/1976 | Schurmann et al. | 428/425 |

*Primary Examiner*—M. J. Welsh
*Attorney, Agent, or Firm*—Albert L. Gazzola; Morton Friedman

[57] ABSTRACT

Novel stable substantially linear unsaturated polyurethane resins which lend themselves to polymerization, in air, by actinic light using low levels of photo-initiator and with no amine activator, said resins having a tertiary amine group and a terminal vinylidene group, i.e. $H_2C = C<$ by the reaction of an isocyanate with a hydroxyalkyl acrylate or an allyl alcohol monomer. Both the resin and the cured products therefrom have little or no detectable amine odor.

24 Claims, No Drawings

STABLE TERTIARY AMINE CONTAINING TERMINALLY UNSATURATED POLYURETHANE RESINS

This invention relates to certain novel stable substantially linear, terminally unsaturated polyurethane resins having a tertiary amino group, which lend themselves to polymerization by actinic light using low levels of photoinitiator and with no external amine activator.

Linear isocyanate terminated polyurethanes from polyether and polyester polyols containing a tertiary amino group, are known in the art. Before this invention was made, however, it was not known that these isocyanate terminated polyurethanes, when reacted stoichiometrically with a vinylidene monomer (alkyl or vinyl monomer) having a terminal labile hydrogen (one that is reactive with an isocyanate), such as, for instance, allyl alcohol, and more preferably a vinyl monomer, such as a hydroxyalkyl acrylate or methacrylate, for instance, yield novel resinous products which lend themselves to polymerization by actinic light via a photochemical initiator using no external amine activator.

The present polyurethane resins can also be prepared from other isocyanate terminated prepolymers such as, for instance, the mono isocyanate terminated prepolymer from the reaction of a vinylidene monomer, described above, and a di-isocyanate. They are prepared by reacting this terminal mono-isocyanate, monounsaturated prepolymer with a polyol and a tertiary diol amine. Terminally unsaturated polyurethane resins having a tertiary amine, no matter how they are prepared, represent the novel compounds of this invention.

Another method of preparation of the present terminally unsaturated polyurethane resins having a tertiary amine therein, resides in reacting a tertiary amine diol with an isocyanate terminated polyol prepolymer in the presence of substantially one equivalent of di-isocyanate based on the number of available hydroxy groups and then reacting this product with a vinylidene monomer having a labile hydrogen, to yield the present polyurethane resin product.

The isocyanate equivalents, as stated herein, are based on the available hydroxy groups.

It would be expected before this invention was made that the present unsaturated polyurethane resins would not be stable, because of the presence of a tertiary amine in the molecule, but surprisingly, they are quite stable even on prolonged storage.

In the present unsaturated polyurethane resins, the number of reactive terminal vinylidene groups, i.e. $H_2C=C<$ are present in the range of about 1.5–2.5 of these unsaturated groups, per molecule, and preferably about 2.0 of these groups are present.

As stated above, the present polyurethane resins can be polymerized by actinic light, for instance, with little or no additional amine activator, and low levels of a photochemical initiator for polymerizing unsaturated monomers or oligomers. It is an advantage that the films and adhesives, for instance, made from the present polyurethane resins, surprisingly, have little, if any, amine odor, even when using small amounts of amine activator.

The state of the art is represented by the following U.S. Patents: U.S. Pat. No. 3,971,764, issued to Schurmann et al. on July 27, 1976; U.S. Pat. No. 3,877,945, issued to Rosenhahn et al. on April 15, 1975; U.S. Pat. No. 3,877,971, issued to Guthrie et al. also on April 15, 1975; U.S. Pat. No. 3,899,611, issued to Hall on August 12, 1975; U.S. Pat. No. 3,873,484, issued to Bluestein et al. on March 25, 1975; U.S. Pat. No. 3,641,199, issued to Niederhauser on February 8, 1972; U.S. Pat. No. 3,509,234, issued to Burlant on April 28, 1970; and U.S. Pat. No. 3,448,171, issued to Damusis on June 3, 1969; all incorporated herein by reference.

Suitable monomers which are reactive with an isocyanate, according to the present invention, are those which have a terminal labile hydrogen and terminal unsaturation. These monomers include, for instance, hydroxyethyl acrylate, hydroxyethyl methacrylate, propylene glycol monoacrylate, hydroxypropyl methacrylate, beta-hydroxypropyl acrylate, t-butyl hydroxy methacrylate, trimethylol propane diallyl ether, allyl amine, allyl alcohol, and the like.

Although vinyl monomers are preferred in the preparation of the present polyurethane resins, because they are more photochemically reactive, the less reactive (photochemically) allyl monomers are also capable of reacting with the prepolymers to produce the novel polyurethane resins of the present invention, and these resins may also be photochemically activated but they do so at a slower rate, to form films and coatings having little or no amine odor.

The final terminally unsaturated polyurethane resin containing a tertiary amine may be treated with a small amount of mono-functional alcohol, a mono-primary amine, a mono-thiol, or an acrylic acid, as known in the art with unsaturated polyurethanes, to further stabilize the resin and to reduce its viscosity.

As stated hereinbefore, it is no matter how the present linear tertiary amine containing terminally unsaturated polyurethane resins are prepared, just so long as the resins include a tertiary amine, a polyol, and terminal unsaturation. All of these products are stable and lend themselves to curing by actinic light as stated hereinbefore, to produce excellent films which have substantially little or no detectable amine odor.

The tertiary amine in the present isocyanate terminated polyurethane prepolymer may be located at any point in the molecule of the prepolymer. It may be in the backbone of the prepolymer, i.e.:

wherein R may be alkyl, cyclic alkyl or aryl or it may be pendant, i.e.:

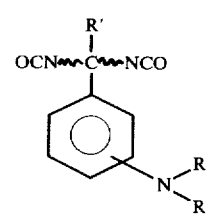

wherein R" may be hydrogen or as in R, supra, and may be the same or different. Virtually any isocyanate terminated linear polyurethane polyol prepolymer having a tertiary amino group in its molecule, is capable of being converted to an unsaturated polyurethane resin by reaction of the free isocyanate group with a vinyl or allyl monomer having a terminal labile hydrogen; and virtually any terminally unsaturated isocyanate terminated prepolymer may be reacted with a mixture of polyol and tertiary amine diol, for instance, to arrive at the present novel polyurethane resins.

The terminal unsaturated linear polyurethane resins of the present invention are preferably those which have a fluid consistency, i.e. pourable to form films, coatings, inks, varnishes, and adhesives, for instance, but they may also be of a solid or of a highly viscous character, as known in the art. In either case, they can be polymerized by actinic light using low levels of photo-initiator and with no amine activator. Of course, a small amount of amine activator may be added to accelerate the polymerization, as known in the art.

Although the present resins, surprisingly, have little or no amine odor, even more surprising is the stability of the resins. It would be expected, because of the presence of the tertiary amine, that the resins would be unstable. The present unsaturated linear polyurethane resins, however, are very stable at ordinary temperatures, i.e. 10°–50° C., for prolonged periods, as is seen in the appended examples.

Furthermore, the present unsaturated polyurethane resins are curable in air using actinic light. It is an advantage in the curing of these resins that an inert atmosphere is not required, but such atmosphere, i.e. nitrogen, may be employed if desired.

The prepolymer which is utilized in accordance with the present invention is a substantially linear, isocyanate-terminated polyurethane, that is, it may be slightly branched. In one aspect of the present invention the preferred prepolymer can be, generally, prepared by the reaction of a diol which may include a little triol, a polyisocyanate, a tertiary amino polyol, preferably an N-alkyl or aryl dialkanolamine, or other substantially linear terminal dihydroxy tertiary amines such as a terminal dihydric alcohol having a tertiary amine having a structure such as:

$$\begin{array}{c} H \\ | \\ HOR-C-ROH \\ | \\ Y \end{array}$$

where Y is a tertiary alkyl or aryl amine and can be, for instance:

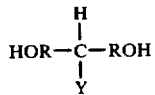 or 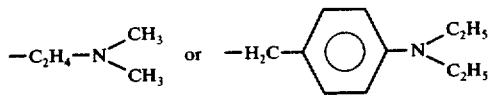

The polyether or polyester polyol utilized for the preparation of the prepolymer has a hydroxyl number preferably in the range of from about 10 to about 200, most preferably in the range of from about 20 to about 80 and optimally from about 30 to about 60, and is preferably a diol, most preferably an alkoxylated ether diol, or a mixture of an alkoxylated diol and a triol. It has been found that by utilizing a minor proportion by weight of a triol, in combination with a major proportion by weight of an alkoxylated diol, a highly desirable, slightly branched prepolymer configuration is obtained. The polyol can also comprise, alternatively, a dihydroxy-containing polyester, and here also, the diol may contain a minor proportion of triol, as in the case of the polyether.

Polyether type polyols are most commonly derived from simple alkane diols, polymerized by reaction with an alkylene oxide, for example, to form the corresponding polyoxyalkylene polyether polyols. The preferred polyhydric monomer can be selected from among the glycols, such as neopentylglycol, ethyleneglycol, diethyleneglycol, hexamethyleneglycol, 1,4- and 1,3-butyleneglycols, 1,3- and 1,2-propyleneglycols, and the corresponding dipropyleneglycols. The most useful monomeric triols present in minor quantities include the alkyl triols, such as trimethylolethane, trimethylolpropane, 1,2,4-butanetriol, 1,2,6-hexanetriol, glycerol, and triethanolamine. Aromatic polyols can also be used, such as trihydroxymethyl benzene.

The alkylene oxides used in preparing the polyether polyols preferably are those which contain from two to about four carbon atoms, for example, ethylene oxide, 1,3-propylene oxide, and 1,2-butylene oxide, and homopolymers and copolymers thereof. The polyhydric, polyalkylene ether can also be prepared from reagents such as glycidol and cyclic ethers, such as di- and tetramethylene ethers, and the epihalohydrins, e.g. epichlorohydrin. The polyaralkylene ether polyols are derived from the corresponding aralkylene oxides, such as for example, styrene oxide, alone or mixed with alkylene oxide. Generally, propylene oxide, i.e. the 1,2-propylene oxide, and mixtures of 1,2-propylene oxide and ethylene oxide are preferred for the preparation of the polyether polyol reactant.

The polyol polyethers are useful in the present invention preferably at a molecular weight of from about 500 to about 8,000, most preferably from 1,400 to about 6,500 and optimally not greater than about 4,000, and a hydroxy functionality of at least about 2 1 up to about 5, and preferably an average hydroxy functionality of from about 2 to about 4.

Generally, the polyester polyol compounds useful for preparing the prepolymer in accordance with the present invention, can in turn be prepared by, for example, the reaction of a polyhydric alcohol with a polybasic acid, generally, each containing from about 2 to 36 carbon atoms. The polycarboxylic acid can be not only the free carboxylic acid, but such acid precursors as the corresponding acid anhydrides or acid halides or even, for example, alkyl esters. The preferred acids are the dicarboxylic acids containing from about 4 to about 12 carbon atoms. Examples of the preferred carboxylic acid components include, for example, aromatic acids such as phthalic acid, terephthalic acid, isophthalic acid, tetrachlorophthalic acid, cycloaliphatic acids, such as dimerized linoleic acid, maleated and fumarated rosin acids, and cyclohexane-1,4-diacetic acid; but preferably include the aliphatic acids, such as oxydipropionic, succinic, glutaric, adipic, azelaic, suberic, and sebacic acids, or combinations of such acids. Lactones can be used in place of the polyester polyols. These include gamma-butyrolactone, or epsilon-caprolactones, for instance. The glycols which can be utilized in the preparation of the prepolymer polyesters include any of those set forth above for the preparation of the polyether polyols. Generally, however, a dihydric polyol is preferred when preparing the polyester even more than when preparing the polyether polyol.

The polyester polyols preferably have a molecular weight of at least about 1,000 and optimally between about 1,400 and about 4,000. Generally, the maximum molecular weight, for both the polyether and the polyester polyols, is limited primarily by the difficulty of mixing such a material with the other ingredients in the procedure. Thus, the higher molecular weight ingredients are useful, but because of the difficulty of working with them, they are not considered economical or practical and, therefore, are less preferred. Extremely powerful mixing apparatus must be provided when dealing with such high molecular weight materials.

The organic polyisocyanates useful in preparing the prepolymer compound in accordance with the present invention include the various conventional materials available to the art. Such polyisocyanates contain two isocyanate groups per molecule. The useful isocyanates include, for example, the aromatic, aliphatic, cycloaliphatic, and heterocyclic di-isocyanates. Suitable organic di-isocyanates include, for example, n-butylene di-isocyanate, methylene di-isocyanate, m-xylylene di-isocyanate, p-xylylene di-isocyanate, cyclohexyl-1,4-di-isocyanate, cyclohexane-1,4-bis(methyl isocyanate) dicyclohexylmethane-4,4'-di-isocyanate, m-phenylene di-isocyanate, p-phenylene di-isocyanate, 3-(alpha-isocyanatoethyl)-phenyl isocyanate, 2,6-diethylbenzene-1,4-di-isocyanate, diphenyldimethylmethane-4,4'-di-isocyanate, ethylidene di-isocyanate, propylene-1,2-di-isocyanate, cyclohexylene-1,2-di-isocyanate, 2,4-toluene di-isocyanate, 2,6-toluene di-isocyanate, 3,3'-dimethyl-4,4'-biphenylene di-isocyanate, 3,3'-dimethoxy-4,4'-biphenylene di-isocyanate, 3,3'-diphenyl-4,4'-biphenylene di-isocyanate, 4,4'-biphenylene di-isocyanate, 3,3'-dichloro-4,4'-biphenylene di-isocyanate, 1,5-naphthalene di-isocyanate, diphenylmethane di-isocyanate, 1,6-hexamethylene di-isocyanate, and isophorone di-isocyanate.

The aromatic di-isocyanates and the polycyclic cycloaliphatic di-isocyanates are preferred. The polyisocyanates which have been found most useful in the preparation of the prepolymers are, specifically, the toluene di-isocyanate isomers, 4,4'-dicyclohexylmethyl-di-isocyanate, cyclohexane-1,4'-bis(methyl isocyanate), and mixtures thereof.

In accordance with a preferred aspect of the present invention, a tertiary amine, i.e. an N-alkyl or N-aryl dialkanolamine, is reacted with the polyol and polyisocyanate. The tertiary dialkanolamine is an N-alkyl dialkanolamine, wherein the alkanol groups include those having 2–3 carbon atoms and cycloalkyl having up to about 6 carbon atoms. The N-alkyl is one which can contain up to 20 carbon atoms. The useful such compounds include, for example, N-methyl diethanolamine, N-methyl dipropanolamine, N-methyl di-isopropanolamine, N-propyl diethanolamine, but, of course, it can also be an N-aryl dialkanolamine, such as N-phenyl diethanolamine or alkaryl such as 3-(N,N-dimethyl toluidyl)-1,5-pentane diol, for instance, and the like.

A catalyst is preferably present to increase the rate of reaction, especially between the polyisocyanate and the polyol. Catalysts which are useful for this reaction are well known in the art and include, for example, metal catalysts such as tin compounds and iron compounds, as well as other metal compounds, such as compounds of cobalt, lead, vanadium, chromium, tungsten, antimony, and titanium. Most preferred are the tin compounds, which include the stannous salts, e.g. stannous octoate, stannous acetate, and stannous oleate, the stannic salts, e.g. stannic diacetate, and stannic di-octoate, and also the covalently-linked, so-called organotin compounds, such as the dialkyltin dicarboxylate salts, including, for example, dibutyltin diacetate, and dibutyltin dilaurate, and tributyltin oxide.

The preparation of the polyisocyanate prepolymer, as described hereinbefore, is conventional in the art, and the various materials useful for forming such a prepolymer are generally described in the literature, for example, in the text, *Polyurethanes: Chemistry and Technology*, by Saunders and Frisch, published by Interscience Publishers (New York, 1964); also see U.S. Pat. No. 3,873,484, cited supra.

The prepolymer is generally prepared in an anhydrous medium, and can include the presence of an inert diluent, or solvent medium. The presence of solvent is optional, and can be avoided depending upon the state and viscosity, if liquid, of the various reagents. Generally, not more than about 20% of an organic solvent is utilizied, if any. Any suitable inert organic solvent can be utilized, and the term "inert" in this context refers to an ingredient which does not enter into, nor interfere with, the course of the prepolymerization reactions. Useful such solvents include acetone, tetrahydrofuran, dimethylformamide, ethylacetate, benzene, dioxane, and the like. The solvent most preferably has a boiling point in the range of from about 40° C. to about 90° C., in order to facilitate removal of the solvent. Most preferably, the solvent is a reactive diluent such as acrylic esters, methacrylic esters, styrene, vinyl toluene, n-vinyl pyrrolidone, vinyl acetate, isobornyl acrylate, and the like, as known in the art.

It has been found that the ratios of the various reagents, in forming the prepolymer, are significant in determining the final properties of the resin. The art generally recognizes that the preparation of a commercially-useful resin, whether to be used as a coating, film, or as an adhesive, for example, requires the careful balancing of a large number of factors, including not only the primary reactants cited above, but also the catalyst, and the parameters of the process, including the temperature, the order of feeding of the various reagents and other reaction conditions. The general procedures and problems involved in providing a suitably-balanced mixture of the reagents and proper reaction conditions, are well known to those in the art. It is a matter of routine to those so skilled to prepare a balanced formulation for use in a given process and with available apparatus.

For example, the proportions of the polyisocyanate reactant-to-the polyhydric reactant, including one or more polyols, can be varied as one means of changing the properties of the urethane resin film. In preparing the prepolymer, generally the total isocyanate (—NCO) equivalent-to-total hydroxy equivalent, should be such as to provide from about 1.0 to about 2.4 equivalents of the hydroxy to about 2 to about 5 equivalents of the isocyanate. Preferably, the proportions of the major reagents in the prepolymer reaction mixture are as follows:

Polyol About 0.8 to about 1.2 equivalents
N-alkyl Dialkanolamine About 0.01 to about 1.2 equivalents
Polyisocyanate About 2 to about 5 equivalents The proportion of polyol to dialkanolamine may be as low as 1:0.01 to up to 1:1, depending on the system used, as known in the art.

Although the prepolymer can be prepared with proportions of the reagents outside of the above ranges, it has been found that the polyurethane resin products prepared from such prepolymers do not have reproducible characteristics or are of an inferior grade and less preferred.

The following examples are intended to illustrate specific embodiments of the present invention and are not to be construed to be limiting thereto.

EXAMPLE 1

To a 30 gallon glass lined reactor equipped with a heating-cooling jacket, condenser, stirrer, thermocouple, vacuum take-off, and gas inlet was charged 47.446kg (45.6 equivalent) of a commercially available poly (propylene ether) glycol having a molecular weight of about 2092 and a hydroxyl number of 53.6, and was degassed under vacuum for 30 minutes at 85°-90° C. Then under an atmosphere of nitrogen was added 2.7kg (45.6 equivalent) of N-methyl diethanolamine, 0.375kg (8.4 equivalent) of trimethylolpropane, and 11.5g of dibutyltin dilaurate as a catalyst. The temperature was reduced to 50° C. and 26.49kg (198.8 equivalent) of methylene bis(4-cyclohexyl isocyanate) sold under the tradename "Hylene ® W" by E. I. DuPont, was charged to the reactor and the reaction mixed at 70°-75° C. for 4 hours. After cooling to 50° C., 12.674kg (2.07 equivalent) of commercially available hydroxy propyl acrylate (equivalent weight 130) containing 30g of p-methoxy phenol, as added inhibitor, was added to the reactor, the nitrogen was replaced by dry air, and the reaction maintained at 74°-75° C. for 12 hours. At this time 1.4kg of isopropanol (about 1.5 weight percent based on reactor charge) and 9.18g of di-tert-butyl-p-cresol sold under the tradename "Ionol ®" by Shell, was added to the reaction to produce a product which after 24 hours had a Brookfield viscosity of 17,900 cps at 50° C., Gardner color of 2, a percent nonvolatiles (ASTM D-1644 Method A) of 97.4, a free NCO value of less than 0.1%, remains fluid after 24 hours at 110° C., and is hereinafter referred to as Product A.

Note: The foregoing equivalents and those in all the following examples are based on functional equivalent weights.

EXAMPLE 2

In a resin kettle equipped with a condenser, stirrer, thermometer, and gas inlet and outlet, 300g (0.3 equivalent) of a commercially available poly (propylene ether) glycol sold under the tradename "Thanol PPG-2000" by Texaco was degassed under vacuum for 0.5 hours at 70° C. Thereafter under a nitrogen atmosphere 17.8g (0.3 equivalent) of N-methyl diethanolamine commercially available from Union Carbide as NMDEA, 2.4g (0.0528 equivalent) of trimethylolpropane and 3 drops of dibutyltin dilaurate as a catalyst was charged to the kettle and stirred until the trimethylolpropane was blended into the reaction. After cooling to 50° C., 175g (1.308 equivalent) of methylene bis(4-cyclohexy isocyanate) sold under the tradename "Hylene ® W" by E. I. DuPont, was added to the kettle and the reaction was continued with stirring at 70°-75° C. for 3 hours. After cooling to 50° C. 94.4g (0.655 equivalent) of commercially available hydroxypropyl methacrylate containing 400 ppm p-methoxy phenol as added inhibitor, was added and the reaction continued for 16 hours at 60° C. under dry air. At this time 8g of isopropanol and 0.525g of di-tert-butyl-p-cresol was added to the reaction and stirring continued for 30 minutes to give a product hereinafter referred to as Product B.

EXAMPLE 3

The procedure of Example 2 was repeated except that the hydroxypropyl methacrylate was replaced by 40.0g (0.655 equivalent) allyl alcohol to give a product hereinafter referred to as Product C.

EXAMPLE 4

The procedure of Example 2 was repeated except that the hydroxypropyl methacrylate was replaced by 76.0g (0.655 equivalent) hydroxyethyl acrylate to give a product hereinafter referred to as Product C-1.

EXAMPLE 5

The procedure of Example 2 was repeated except that the hydroxypropyl methacrylate was replaced by hydroxypropyl acrylate and N-methyl diethanolamine was replaced by phenyl diethanolamine to give a product hereinafter referred to as Product D.

EXAMPLE 6

The procedure of Example 2 was repeated except that the hydroxypropyl methacrylate was replaced by hydroxypropyl acrylate and N-methyl diethanolamine was replaced by n-tolyl diethanol amine to give a product hereinafter referred to as Product E.

EXAMPLE 7

The procedure of Example 2 was repeated except that the hydroxypropyl methacrylate was replaced by hydroxypropyl acrylate and the N-methyl diethanolamine was replaced by N-butyl diethanolamine to give a product hereinafter referred to as Product F.

EXAMPLE 8

The procedure of Example 2 was repeated except that the hydroxypropyl methacrylate was replaced by hydroxypropyl acrylate and the N-methyl diethanolamine was replaced by 2-methyl-2-diethyl-amino-methyl-1,3 propane diol to give a product hereinafter referred to as Product G.

EXAMPLE 9

The procedure of Example 2 was repeated except that the poly (propylene ether) glycol was replaced by a poly (ethylene ether) glycol having a molecular weight of 1,450 and the hydroxypropyl methacrylate was replaced by hydroxypropyl acrylate to give a product hereinafter referred to as Product H.

EXAMPLE 10

In a resin kettle equipped with a condenser, stirrer, thermometer, and gas inlet and outlet, 300g (0.3 equivalent) of a commercially available poly (propylene-ether) glycol sold under the tradename "Thanol PPG-2000" by Texaco, was degassed under vacuum for 0.5 hours at 70° C. Thereafter, under a nitrogen atmosphere, 1.2g (0.0264 equivalent) of trimethylol propane and 3 drops of dibutyltin dilaurate as a catalyst was charged to the kettle and stirred until the trimethylol propane blended into the reaction. After cooling to 50° C., 87.5g (0.653 equivalent) of methylene bis(4-cyclohexyl isocyanate) sold under the tradename "Hylene ® W" by E. I. DuPont, was added to the kettle and the reaction continued with stirring at 70°-75° C. for 3 hours. After cooling to 50° C., 42.9g (0.33 equivalent) of hydroxypropyl acrylate containing 400 ppm additional p-methoxy phenol as inhibitor was added and the reaction continued for 16 hours under dry air. At this time 6.5g of isopropanol and 0.43g of di-tert-butyl-p-cresol was added to the reaction and stirring continued for 30 minutes to give a product hereinafter referred to as Product I.

EXAMPLE 11

To a resin kettle maintained under a nitrogen atmosphere and equipped with a condenser, stirrer, thermometer, and gas inlet and outlet was charged 1,355g (1.5 equivalent) of a molten polyester diol (having a hydroxy number of 62.01, an acid number of 0.5, moisture content of 0.20%, a color value of 80 APHA, and a Brookfield viscosity of 950 cps at 70° C.) sold under the tradename "Formrez L8-71" by Witco Chemical Corporation, and the temperature of the polyester diol adjusted to 65° C., degassed in vacuo for 0.5 hour, and 0.2g of dibutyltin dilaurate added as a catalyst. 804g (6.0 equivalent) of methylene bis(4-cyclohexyl isocyanate) sold under the tradename "Hylene ® W" by E. I. DuPont, was added to the kettle and the reaction maintained at 70° C. for 1 hour, at which point 89.4g (1.5 equivalent) of N-methyl diethanolamine was added and over a period of 15 minutes the temperature maintained at 70° C. by cooling (as required) during the addition. The temperature was maintained at 70° C. for a period of 5 hours, at which time 390g (3.0 equivalent) of hydroxypropyl acrylate, containing 400 ppm of additional p-methoxy phenol as inhibitor, was added and the temperature maintained at 70° C. for 3 hours. 40g isopropanol and 2.64g of di-tert-butyl-p-cresol was added to the reaction and stirring continued for 30 minutes to give a product hereinafter referred to as Product J.

EXAMPLE 12

To a resin kettle maintained under a nitrogen atmosphere and equipped with a condenser, stirrer, thermometer, and gas inlet and outlet was charged 135.5g (0.15 equivalent) of a molten polyester diol (having a hydroxyl number of 62.01, an acid number of 0.5, and a moisture content of 0.20%) sold under the tradename "Formrez L8-71" by Witco Chemical Corporation, and the temperature of the polyester diol adjusted to 65° C. and 1 drop of dibutyltin dilaurate added as catalyst. 52.3g (0.39 equivalent) of methylene bis(4-cyclohexyl isocyanate) sold under the tradename "Hylene ® W" by E. I. DuPont, was added to the kettle and the reaction maintained at 70° C. for one hour at which point 2.4g (0.04 equivalent) of N-methyl diethanol amine was added with the temperature maintained at 70° C. After 5 hours 22g (0.17 equivalent) of hydroxypropyl acrylate containing 400 ppm of additional p-methoxy phenol as inhibitor was added and the temperature held at 70° C. for 3 hours. 3g of isopropanol and 0.2g of di-tert-butyl-p-cresol was added to the reaction and after 30 minutes stirring a product was obtained hereinafter referred to as Product K.

EXAMPLE 13

The procedure of Example 12 was repeated except that the amount of methylene bis(4-cyclohexyl isocyanate) was 60.5g (0.45 equivalent) the amount of N-methyl diethanolamine was 4.5g (0.075 equivalent) and the amount of hydroxypropyl acrylate was 28.6g (0.22 equivalent) to give a product hereinafter referred to as Product L.

EXAMPLE 14

To a 5 liter resin kettle equipped with a condenser, stirrer, thermometer, gas inlet and outlet was added 1355g (1.5 equivalent) of a molten polyester diol (having a hydroxyl number of 62.01, an acid number of 0.5, and a moisture content of 0.20%) sold under the tradename "Formrez L-8-71" by Witco Chemical Corporation. The resin was heated to 100° C. and degassed for 30 minutes and then the temperature of the polyester diol was adjusted to 65° C. 339.6g (3.87 equivalent) of a mixture of toluene-2,4-di-isocyanate and toluene-2,6-di-isocyanate sold under the tradename "Hylene ® TM" by E. I. DuPont was added, and the exotherm held to 70°-74° C. by external cooling. After 1 hour, 22.2g (0.375 equivalent) of N-methyl diethanolamine was added and the exotherm controlled by external cooling to 70°-72° C. After 4 hours at 70° C., 220.2g (1.69 equivalent) of hydroxypropyl acrylate was added and the reaction continued at 70° C. for 6 hours. At this time, 0.1g of di-tert-butyl-p-cresol was added and after 30 minutes gave the product hereinafter referred to as Product M.

EXAMPLE 15

Using the procedure described in Example 2, except that the 0.3 equivalent of poly (propylene ether) glycol was replaced by 271g (0.3 equivalent) of a polyester diol (having a hydroxyl number of 62.01, an acid number of 0.5, and a moisture content of 0.20%) sold under the tradename "Formrez L8-71" by Witco Chemical Corporation, and the 1.308 equivalent of methylene bis(4-cyclohexyl isocyanate) replaced by 113.8g (1.308 equivalent) of a mixture of toluene-2,4-di-isocyanate and toluene-2,6-di-isocyanate sold under the tradename "Hylene ® TM" by E. I. DuPont. The reaction gelled during the hydroxypropyl acrylate addition and the addition discontinued.

A comparison of Examples 2, 14, and 15 shows that Example 14 is an improvement over Examples 15 and 2 where polyester diols and toluene di-isocyanate are employed. A comparison of Examples 14 and 15 shows that when starting with a highly reactive di-isocyanate one must alter the order of addition to avoid premature cross-linking (i.e. gelation) which renders the product useless as a curable liquid prepolymer.

EXAMPLE 16

200g (0.286 equivalent) of a commercially available liquid polymeric di-isocyanate with an NCO% of 6.1 sold under the tradename "Formrez P-610" by Witco Chemical Corporation, was changed to a dry resin kettle maintained under a nitrogen atmosphere and equipped with a condenser, stirrer, thermometer, gas inlet and outlet and heated to 50° C., 4.98g (0.0575 equivalent) of toluene di-isocyanate (Hylene ® TM) was added to the kettle with stirring at 50° C. After 15 minutes, 1.75g (0.0295 equivalent) of N-methyl diethanolamine was added to the kettle and the reaction continued for 2 hours at 50° C. 43.1g (0.324 equivalent) of hydroxypropyl acrylate was added to the kettle at 50° C. and the reaction continued 16 hours at 50° C. At this time, based on the total charge, the following were added to the reactor 0.000075 weight percent phenothiazine, 1.5 weight percent isopropanol, and 0.1 weight percent di-tertbutyl-cresol to give a product hereinafter referred to as Product N.

EXAMPLE 17

The procedure of Example 16 was repeated except that 12.5g (0.143 equivalent) of toluene di-isocyanate (Hylene® TM), 4.3g (0.071 equivalent) of N-methyl diethanolamine, and 47.2g (0.355 equivalent) of hydroxypropyl acrylate were used to give a product hereinafter referred to as Product P.

EXAMPLE 18

The procedure of Example 16 was repeated except that 24.9g (0.286 equivalent) of toluene di-isocyanate (Hylene® TM), 8.73g (0.143 equivalent) of N-methyl diethanolamine, and 56.1g (0.422 equivalent) of hydroxypropyl acrylate were used to give a product hereinafter referred to as Product Q.

EXAMPLE 19

The procedure of Example 16 was repeated except that the liquid polymeric di-isocyanate was replaced by 297.69g (0.286 equivalent) of another commercially available liquid polymeric di-isocyanate with an NCO% of 4.1 sold under the tradename "Formrez P-410" by Witco Chemical Corporation to give a product hereinafter referred to as Product R.

EXAMPLE 20

The procedure of Example 17 was repeated except that the liquid polymeric di-isocyanate was replaced by 297.6g (0.286 equivalent) of another liquid polymer di-isocyanate with an NCO% of 4.1 sold under the tradename "Formrez P-410" by Witco Chemical Corporation, to give a product hereinafter referred to as Product S.

EXAMPLE 21

The procedure of Example 18 was repeated except that the liquid polymeric di-isocyanate was replaced by 297.6g (0.286 equivalent) of another liquid polymeric di-isocyanate with an NCO% of 4.1 sold under the tradename "Formrez P-410" by Witco Chemical Corporation, to give a product hereinafter referred to as Product T.

EXAMPLES 22, 23, 24

The procedure described in Examples 19, 20, and 21 were followed except that the liquid polymeric di-isocyanate was replaced by 134g (0.286 equivalent) of another liquid polymeric di-isocyanate with an NCO% of 9.1 sold under the tradename "Formrez P-910" by Witco Chemical Corporation, to give products hereinafter referred to as Products U, V, and W, respectively.

EXAMPLES 25, 26, 27

783g (1.135 equivalent) of a commercially available liquid polymeric di-isocyanate with an NCO of 6.1% sold under the tradename "Formrez P-610" by Witco Chemical Corporation, was charged to a dry epoxy-lined gallon paint can and heated to 50° C. 151g (1.135 equivalent) of hydroxypropyl acrylate containing 0.001 weight percent p-methoxy phenol as added inhibitor was added to the can and the mixture thoroughly blended under a dry air flow. The can was capped and placed in a 70° C. oven for 10 hours to give a product hereinafter referred to as Product X.

In a similar manner using the same NCO to OH ratio, the liquid polymeric di-isocyanates "Formrez 910" (NCO content 9.1%) and "Formrez 410" (NCO content 4.1%) gave products hereinafter referred to as Products Y and Z.

EXAMPLE 28

In a resin kettle equipped with a condenser, stirrer, thermometer, and gas inlet and outlet, 300g (0.3 equivalent) of a commercially available poly (propylene ether) glycol sold under the tradename "Thanol PPG-2000" by Texaco, was degassed under vacuum for 0.5 hours at 70° C. Thereafter, under a nitrogen atmosphere 17.8g (0.3 equivalent) of N-methyl diethanolamine, commercially available from Union Carbide as NMDEA, 2.4g (0.0528 equivalent) of trimethylol propane, and 3 drops of dibutyltin dilaurate as catalyst was charged to the kettle and stirred until the trimethylol propane was blended into the reaction. After cooling to 50° C., 484g (1.308 equivalent) of the product, having a NCO value of 11.35%, resulting after the reaction of 1 equivalent of hydroxypropyl methacrylate with 2 equivalents of mixed isomers toluene di-isocyanate followed by vacuum stripping to remove most of the excess toluene di-isocyanate, was added to the kettle and the reaction continued with stirring at 70°–75° C. for 3 hours. After removal from the kettle the reaction was held in an epoxy-lined can under dry air at 50° C. for 16 hours to give a product hereinafter referred to as Product AA.

The products in the foregoing examples are cured by the general procedure, as follows: To 90 grams of warm (50° C.) product was added 10 grams of methyl methacrylate and the given amount of benzophenone. After stirring to dissolve the benzophenone, a 1 to 3 mil wet film was drawn. The film was cured by passing it under two 200 watt per inch medium pressure mercury lamps in a commercially available U.V. curing unit sold by Ashdee, division of George Koch, as the Ashdee #UV12 H2.5-12.

The following Table I shows the tack-free character of the films made by the present polyurethane resins. "T" indicates tacky and "C" indicates tack-free. No external amine accelarator was added.

EXAMPLE 29

In a reaction kettle equipped with a condenser, stirrer, thermometer, and gas inlet and outlet, 1,956g (1.98 equivalents) of a commercially available poly (propylene ether) glycol sold under the tradename "Thanol PPG-2000" by Texaco, was degassed under vacuum for 0.5 hours at 60° C. Thereafter was added under a nitrogen atmosphere 480.5g (5.46 equivalents) of a mixture of toluene 2,4-di-isocyanate and toluene 2,6-di-isocyanate sold under the tradename "Hylene® TM" by E. I. DuPont, with stirring and external cooling to maintain a reaction temperature of about 60° C. After one hour at 60° C., 16 drops of dibutyltin dilaurate as a catalyst was added and the reaction continued at 60° C. for 2 hours. At this time was added 319.8g (2.46 equivalents) of hydroxypropyl acrylate containing 600 ppm of methyl ethyl ether of hydroquinone and 500 ppm of phenothiazine and an additional 16 drops of dibutyltin dilaurate as catalyst. The reaction was maintained at about 60° C. for 4 hours at which point 55.3g (0.93 equivalent) of N-methyl diethanolamine was added to react with the remaining free —NCO. After 1 hour, 43g of isopropanol (1.5 weight percent) was added to give a product hereinafter referred to as Product BB with the following properties:

| | |
|---|---|
| Brookfield Viscosity RVT #7 Spindle at 25° C | 1,036 Poise |
| Brookfield Viscosity RVT #4 Spindle at 50° C | 104 Poise |
| % Non-volatiles (ASTM 1644 Method A) | 98.0 % |
| Stability at 50° C | >24 Days |
| Stability at 110° C | >6 Days |
| Color Gardner | 1 |

TABLE I

| | Photoactivator - Benzophenone | | | | | | | | |
|---|---|---|---|---|---|---|---|---|---|
| Parts/100 Resin | 0.5 | | | 1.0 | | | 2.0 | | |
| Belt Speed Ft/Min | 10 | 20 | 60 | 20 | 60 | 100 | 60 | 100 | 120 |
| PRODUCT | | | | | | | | | |
| A | C | C | C | C | C | C | C | C | C |
| B | C | C | T | C | C | T | C | C | T |
| C | C | T | T | C | T | T | C | T | T |
| C-1 | C | C | C | C | C | C | C | C | C |
| D | C | C | C | C | C | C | C | C | C |
| E | C | C | C | C | C | C | C | C | C |
| F | C | C | C | C | C | C | C | C | C |
| G | C | C | C | C | C | C | C | C | C |
| H | C | C | T | C | C | T | C | T | T |
| I | T | T | T | T | T | T | T | T | T |
| J | C | C | C | C | C | C | C | C | C |
| K | C | C | C | C | C | C | C | C | C |
| L | C | C | C | C | C | C | C | C | T |
| M | C | C | C | C | C | C | C | C | C |
| N | — | — | — | C | C | C | — | — | — |
| P | C | C | C | C | C | C | — | — | — |
| Q | — | — | — | C | C | C | — | — | — |
| R | — | — | — | C | C | C | — | — | — |
| S | C | C | C | C | C | C | — | — | — |
| T | — | — | — | C | C | C | — | — | — |
| U | C | C | C | C | C | C | — | — | — |
| V | — | — | — | C | C | C | — | — | — |
| W | — | — | — | C | C | C | — | — | — |
| X | T | T | T | T | T | T | T | — | — |
| Y | T | T | T | T | T | — | T | — | — |
| Z | T | T | T | T | T | — | T | — | — |
| AA | C | C | C | C | C | C | C | C | C |
| BB | C | C | C | C | C | C | C | C | C |

STABILITY OF PRODUCTS

Products A, B, J, P, S, and U were stored at room temperature under air for six months in metal cans. At the end of this period the resins were warmed to 50° C. to facilitate formulation and compounded as described hereinbefore. No gel particles were observed in the cast films nor were any problems observed in compounding. The formulations gave excellent films having little, if any, amine odor.

Products A and AA were stored at elevated temperature in 4 ounce brown glass jars and inspected periodically for gelation. The samples were inverted to test for flowability periodically. It was noted that at the point of transition from a flowable liquid to a gelled solid, that the change was rapid. Product A gelled to a solid after 6,028 hours at 50° C. and 1,362 hours at 110° C. Product AA had not gelled after 5,360 hours at 50° C.

A sample of Product A stored at 50° C. in a metal can under air gave the following Brookfield viscosity measurements at 50° C.:

| First Day | Seven Days | Twenty-Six Days |
|---|---|---|
| $1.7 \times 10^4$ centipoise | $1.79 \times 10^4$ centipoise | $1.80 \times 10^4$ centipoise |

EVALUATION OF PHOTOCURING ACTIVATORS

Product A was formulated as indicated in Table II below. Each formulation was degassed and cured under substantially the same conditions, by two 200 watt per inch medium pressure mercury lamps. Free films were obtained by casting a 3 mil wet film on release paper S/K VEL MATTE CIS obtained from the S. D. Warren Company. After cure the free film ranged from 2.6–2.9 mils thick.

TABLE II

| | | Parts by Weight | | | | | | | | | |
|---|---|---|---|---|---|---|---|---|---|---|---|
| | Product A | 90 | 90 | 95 | 95 | 95 | 95 | 95 | 95 | 100 | 100 |
| | Methylmethacrylate | 10 | 10 | 5 | 5 | 5 | 5 | 5 | 5 | — | — |
| Photo-activator | 2,3 Butanedione | 1 | — | — | — | — | — | — | — | — | — |
| | Adjutan 3516[a] | — | 1 | 0.25 | 0.5 | 1.0 | — | — | — | — | — |
| | Benzil | — | — | — | — | — | 1.0 | 0.5 | 1.0 | — | — |
| | Vicure 30[b] | — | — | — | — | — | — | — | — | 0.25 | 0.5 |
| | Benzophenone | — | — | — | — | — | — | — | — | — | — |
| | α,αDiethoxy-acetophenone | — | — | — | — | — | — | — | — | — | — |
| | Tensile Strength MPa[d] | 17.9 | 12.4 | 14.5 | 15.9 | 14.5 | 15.9 | 17.2 | 16.2 | 15.9 | 13.8 |
| | Elongation % | 60 | 60 | 50 | 60 | 60 | 70 | 60 | 70 | 60 | 50 |
| | Product A | 95 | 95 | 90 | 85 | 85 | 85 | 90 | 90 | 90 | 90 |
| | Methylmethacylate | 5 | 5 | 10 | 15 | 15 | 15 | 10 | 10 | 10 | 10 |
| Photo-activator | 2,3 Butanedione | — | — | — | — | — | — | — | — | — | — |
| | Adjutan 3516[a] | — | — | — | — | 0.5 | — | — | — | — | — |
| | Benzil | — | — | — | — | — | 0.5 | — | — | — | — |
| | Vocure 30[b] | — | — | — | — | — | — | — | — | 2.0 | — |
| | Benzophenone | 0.5 | 1.0 | 1.0 | 0.5 | — | — | — | — | — | — |
| | α,αDiethoxy-acetophenone | — | — | — | — | — | — | 0.5 | 1.0 | — | — |
| | Tensile Strength MPa[d] | 18.6 | 16.6 | 15.2 | 18.6 | 17.9 | 22.1 | 17.9 | 17.2 | 22.9 | — |
| | Elongation % | 60 | 65 | 60 | 70 | 80 | 70 | 60 | 60 | 70 | — |

[a] A product of UOP, Chemical Division
[b] A product of Staufer Chemical Company
[c] A product of Union Carbide Corporation
[d] 1MPa = 1MN/m² = 145 psi Product A was formulated as indicated in Table III below. Each formulation was degassed and drawn down to 2 mil wet films on Q Al-39 aluminum panels. The panels were cured by passing them in presence of air under two 200 watt per inch medium pressure mercury lamps. The cure speed is indicated in the Table and is the speed at which a tack-free film which could not be marked by a fingernail was obtained.

TABLE III

| | Parts By Weight | | | | |
|---|---|---|---|---|---|
| Product A | 75 | 75 | 65 | 75 | 75 |
| 1,6 Hexanediol Diacrylate | 16 | 11 | 11 | 13.5 | 13.5 |
| N-Vinyl Pyrrolidone | 9 | 9 | 9 | 9 | 9 |
| Siloxane Q 2-8026[a] | — | 5 | — | 2.5 | — |

TABLE III-continued

|  | Parts By Weight | | | | |
|---|---|---|---|---|---|
| Siloxane X 2-8024[a] | — | — | 5 | — | 2.5 |
| Benzophenone | 2 | 2 | 2 | 2 | 2 |
| Formulation Before Curing | | | | | |
| Viscosity cps at 25° C | 4080 | 6200 | 8100 | 5050 | 5750 |
| Surface Tension Dynes/cm | 35.2 | 23.0 | 24.8 | 26.4 | 24.2 |
| Cure ft/min | 40 | 60 | 120 | 60 | 120 |
| Wetting (Aluminum) | F-G[b] | G | G | G | G |
| Wetting (Polyethylene Sheet) | F | G | G | G | G |
| Cured Film | | | | | |
| Adhesion To Al % | 50 | 75 | 75 | 75 | 100 |
| Pencil Hardness | 3B | 2B | >4B | 2B | 2B |
| Mandrel Set-Pass | ⅛″ | ⅛″ | ⅛″ | ⅛″ | ⅛″ |
| Abrasion[c] Strokes | 37 | 392 | 1000 | 187 | 1000 |

[a] A product of Dow-Corning
[b] F = Fair - Some Cratering
G = Good - Smooth Film, No Cratering
[c] Number of repeated transversals over the same track by a steel stylus Films were prepared from the formulations as shown in Table IV, degassed and cured in air under the same conditions using two 200 watt per inch medium pressure mercury lamps.

TABLE IV

|  | Parts By Weight | | |
|---|---|---|---|
| Product A | 100 | 75 | 90 |
| N-Vinyl Pyrrolidone | — | 9 | 5 |
| Hexanediol Diacrylate | — | 13.5 | 15 |
| Siloxane X 2-8024[a] | — | 2.5 | — |
| Castomer P-0010[b] | — | — | 10 |
| Benzophenone | 2.5 | 2 | 2 |
| N,N Dimethylethanolamine | 2.5 | 2 | — |
| Silicone L-7002[c] | 1.0 | — | — |
| Dielectric Constant ASTM D-150 1000 Cycles | 3.5 | 3.2 | 3.8 |
| Dissipation Factor ASTM D-150 1000 Cycles | 0.168 | 0.215 | 0.28 |

[a] A product of Dow-Corning Corporation
[b] A product of Witco Chemical Corporation
[c] A product of Union Carbide Corporation Formulations were prepared as indicated in Table V below and 3 mil wet films drawn down on Q Al-39 aluminum panels. The coated panels were cured using substantially the same conditions under two 200 watt per inch medium pressure mercury lamps. Free films were prepared by casting 3 mil wet films on S/K VEL MATTE CIS release paper obtained from S. D. Warren Corporation.

TABLE V

|  | Parts By Weight | | | |
|---|---|---|---|---|
| Product A | 75 | — | — | 90 |
| Product D | — | 75 | — | — |
| Product E | — | — | 75 | — |
| N-Vinyl Pyrrolidone | 30 | 30 | 30 | 10 |
| Benzophenone | 2 | 2 | 2 | 2 |
| Free Film | | | | |
| Tensile Strength MPa | 15.9 | 15.9 | 17.2 | 22.8 |
| Modulus At 50% | 15.2 | 12.4 | 10.3 | — |
| Elongation | 50 | 80 | 90 | 60 |
| Break Set % | 10 | 25 | 20 | — |
| Aluminum Panels | | | | |
| Conical Mandrel Bend | pass | pass | pass | pass |
| Reverse Impact 80 inch/pounds | pass | pass | pass | pass |
| MEK Rubs | >200 | >200 | >200 | >200 |

Formulations were prepared as represented in Table VI, degassed and applied as 3 mil wet films to release paper, as before, and cured in air under substantially the same conditions by two 200 watt per inch medium pressure mercury lamps.

TALBE VI

|  | Parts By Weight | | | |
|---|---|---|---|---|
| Product N | 90 | — | — | — |
| Product P | — | 90 | — | — |
| Product R | — | — | 90 | — |
| Product S | — | — | — | 90 |
| Methylmethacrylate | 10 | 10 | 10 | 10 |
| Vicure 10[a] | 0.5 | 0.5 | 0.5 | 0.5 |
| Silicone L-7002[b] | 1.0 | 1.0 | 1.0 | 1.0 |
| Tensile Strength MPa | 31.0 | 27.6 | 20.7 | 17.2 |
| Elongation % | 50 | 50 | 50 | 50 |

[a] A product of Staufer Chemical Company
[b] A product of Union Carbide Corporation Formulations without photoactivator were prepared, coated on release paper and exposed to the radiation dose indicated to give free films with the indicated tensile strength.

TABLE VII

| | Electron Beam Cure | | |
|---|---|---|---|
|  | Parts By Weight | | |
| Product A | 71 | — | — |
| Product N | — | 85 | — |
| Product R | — | — | 85 |
| 1,6 Hexanediol Diacrylate | 29 | 15 | 15 |
| Tensile Strength MPa At Dose: | | | |
| 1 MRAD | 13.8 | 19.3 | 13.8 |
| 4 MRAD | 17.9 | 26.9 | 19.3 |

We claim:

1. A substantially linear terminally unsaturated polyurethane resin said resin having a tertiary amine group, said terminal unsaturation being a $H_2C = C<$ group, there being about 1.5 to 2.5 of said unsaturated groups per molecule of said polyurethane resin.

2. A resin as in claim 1, which is the reaction product of a mixture of:
 (a) a substantially linear terminal monoisocyanate mono-unsaturated intermediate, said intermediate prepared by reaction excess diisocyanate with a vinyl or allyl monomer having a terminal labile hydrogen
 (b) free diisocyanate,
 (c) a polyol and,
 (d) a tertiary amine diol.

3. A substantially linear unsaturated polyurethane resin as in claim 1, comprising the reaction product of a substantially linear isocyanate terminated prepolymer having a tertiary amine therein and a vinyl or allyl monomer having a terminal labile hydrogen.

4. A resin as in claim 1, comprising the reaction product of a tertiary amine-containing isocyanate terminated prepolymer with a vinyl or allyl monomer having a terminal labile hydrogen, said tertiary amine-containing prepolymer prepared by reacting a mixture of:

(a) an isocyanate terminated prepolymer,
(b) a diisocyanate and,
(c) a tertiary amine diol,
wherein substantially one equivalent of diisocyanate per hydroxy equivalent of amine diol is employed.

5. A polyurethane resin as in claim 3, wherein the substantially linear prepolymer is derived from a polyether polyol having a M.W. bewteen about 1400-6500.

6. A polyurethane resin as in claim 3, wherein the substantially linear prepolymer is derived from a polyester polyol having a M.W. of in the range of about 1400-4000.

7. A polyurethane resin as in claim 3, wherein the substantially linear prepolymer is derived from the reaction of a di-isocyanate, a polyol, and an N-alkyl dialkanolamine having 2-3 carbon atoms in the respective alkanol groups.

8. A polyurethane resin as in claim 3 wherein the substantially linear prepolymer is derived from the reaction of a di-isocyanate, a polyol, and an N-aryl dialkanolamine.

9. A polyurethane resin as in claim 7, wherein the N-alkyl dialkanolamine is N-methyl diethanolamine.

10. A polyether resin as in claim 8, wherein the N-aryl dialkanolamine is N-phenyl diethanolamine.

11. A polyurethane resin as in claim 3, wherein the substantially linear prepolymer is derived from the reaction of a di-isocyanate, a polyol, and a tertiary amine diol having the following structure:

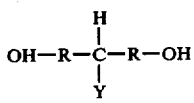

wherein Y is a tertiary alkyl or aryl or alkaryl amine and R is alkyl having 2-3 carbon atoms.

12. A polyether resin as in claim 11, wherein R = $C_2H_4$ and Y =

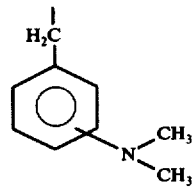

13. A polyurethane resin as in claim 3, wherein said vinyl monomer is hydroxyethyl acrylate.

14. A polyurethane resin as in claim 3, wherein said vinyl monomer is hydroxyethyl methacrylate.

15. A polyurethane resin as in claim 3, wherein said vinyl monomer is hydroxypropyl acrylate.

16. A polyurethane resin as in claim 3, wherein said vinyl monomer is hydroxypropyl methacrylate.

17. A polyurethane resin as in claim 11, wherein the molar ratio of polyol to tertiary amine is in the range of abiout 1:0.01 to 1:1, respectively.

18. A polyurethane resin as in claim 5, wherein the polyol is polypropylene glycol of about 2000 molecular weight.

19. A polyurethane resin as in claim 6, wherein the polyester polyol is derived from hexanediol and adipic acid, and having a molecular weight of about 2000.

20. A polyurethane resin as in claim 3, wherein the prepolymer is derived from a diol and a small amount of triol.

21. A polyurethane resin as in claim 7, wherein the diisocyanate is dicyclohexylmethane-4,4-diisocyanate.

22. A polyurethane resin as in claim 7, wherein the diisocyanate is toluene diisocyanate.

23. a polyurethane resin as in claim 7, wherein the diisocyanate is cyclohexane-1,4-bis(methylisocyanate).

24. A polyurethane resin as in claim 19, wherein the prepolymer is derived from a polyol mixture comprising a major amount of polypropylene glycol of about 2000 molecular weight and a minor amount of trimethylol propane.

* * * * *